United States Patent [19]

Wildner

[11] Patent Number: 4,740,413
[45] Date of Patent: Apr. 26, 1988

[54] BONDED SYNTHETIC-RESIN FILTER PLATE AND METHOD OF MAKING SAME

[75] Inventor: Gerhard Wildner, Nersingen, Fed. Rep. of Germany

[73] Assignee: Lenser Verwaltungs-GmbH, Senden, Fed. Rep. of Germany

[21] Appl. No.: 9,384

[22] Filed: Jan. 30, 1987

[30] Foreign Application Priority Data

Nov. 7, 1986 [DE] Fed. Rep. of Germany ....... 3637977

[51] Int. Cl.$^4$ .......................... B32B 7/04; B32B 27/28
[52] U.S. Cl. ...................................... 428/198; 156/290;
156/307.1; 156/308.4; 156/309.9; 156/322;
210/500.36; 428/517
[58] Field of Search ................... 156/290, 308.4, 309.9,
156/322, 307.1; 210/500.36; 428/198, 517

[56] References Cited

U.S. PATENT DOCUMENTS

| | | | |
|---|---|---|---|
| 3,342,729 | 9/1967 | Strand | 210/500.36 X |
| 3,351,495 | 11/1967 | Larsen et al. | 210/500.36 X |
| 3,532,592 | 10/1970 | Kraus et al. | 428/517 X |
| 4,302,270 | 11/1981 | Nicolet | 156/290 |
| 4,332,858 | 6/1982 | Saitoh et al. | 428/517 X |
| 4,424,253 | 1/1984 | Anderson | 428/517 X |

Primary Examiner—Robert A. Dawson
Attorney, Agent, or Firm—Karl F. Ross; Herbert Dubno

[57] ABSTRACT

A thermoplastic polyolefin substrate, preferably polyethylene or polypropylene, is joined to an ethylene-propylene polymer, preferably an ethylene-propylene-diene elastomer, by first locally preheating only selected portions of the surface of the thermoplastic substrate while maintaining the rest of the surface and of the substrate at a substantially lower temperature, then applying to substantially the entire surface of the substrate an unvulcanized layer of the ethylene-propylene polymer, and finally heating the elastomer layer and thermoplastic substrate to the vulcanization temperature of the polymer to vulcanize and/or cross-link same and to unitarily bond the layer and substrate together on the surface at the selected portions thereof but not on the surface between the selected portions. Thereafter the polymer layer and thermoplastic substrate are cured by cooling. A filter plate for a press filter can be made with this method.

10 Claims, 1 Drawing Sheet

BONDED SYNTHETIC-RESIN FILTER PLATE AND METHOD OF MAKING SAME

FIELD OF THE INVENTION

The present invention relates to the bonding of dissimilar synthetic resins. More particularly this invention concerns a filter plate made by bonding or laminating an ethylene-propylene rubber on a thermoplastic material.

BACKGROUND OF THE INVENTION

Ethylene propylene (EPM) rubbers are synthetic copolymers made by the stereospecific copolymerization of ethylene and propylene. When combined with a third monomer such as diene the resultant ethylene-propylene-diene (EPDM) is a particularly fine synthetic rubber and is felt to be particularly useful in a membrane-type filter plate.

Such a filter plate has a central rigid panel with two opposite and planar faces and formed with a T-shaped passage opening at its edge and at a central location in each face. Overlying each face is an elastic sheet formed with a thick annular rim bounding a ribbed central region. The elastic sheets are joined at the rims to the respective faces of the central panel. In use a plurality of such filter plates is stacked with two mesh filter media pinched between confronting rims of the elastic sheets. Connections are provided to feed an unfiltered suspension to the chamber between two adjacent meshes and to draw off filtrate from between each mesh and the respective ribbed sheet. Periodically the apparatus is pumped out as air or another fluid under pressure is introduced between each elastic sheet and the respective panel face so as to bubble out this sheet and compress the filter cake between the two meshes, making it possible to reverse-flush this filter cake out.

For best operation and ease of assembly the two elastic sheets should be very solidly bonded at their rims to the respective faces of the rigid center panel. Although vulcanizing EPDM to a metal is known from the bumper or shock-absorber art, it is normally not considered possible to solidly bond the EPDM to a thermoplastic synthetic-resin panel of the type ideally used in such filters.

OBJECTS OF THE INVENTION

It is therefore an object of the present invention to provide an improved method of bonding an ethylene-propylene terpolymer to a thermoplastic olefin.

Another object is to provide an improved way of making a filter plate of such materials.

A further object is the provision of a filter plate made of an ethylene-propylene terpolymer and a thermoplastic olefin.

SUMMARY OF THE INVENTION

A thermoplastic polyolefin substrate, preferably polyethylene or polypropylene, is joined to an ethylene-propylene polymer, preferably an ethylene-propylene-diene elastomer, according to the invention by first locally preheating only selected portions of the surface of the thermoplastic substrate while maintaining the rest of the surface and of the substrate at a substantially lower temperature, then applying to substantially the entire surface of the substrate an unvulcanized layer of the ethylene-propylene polymer, and finally heating the elastomer layer and thermoplastic substrate to the vulcanization temperature of the polymer to vulcanize and/or cross-link same and to unitarily bond the layer and substrate together on the surface at the selected portions thereof but not on the surface between the selected portions. Thereafter the polymer layer and thermoplastic substrate are cured by cooling.

With this system there is actually a mingling of the two resins at the preheated surface portions so that they are integrally bonded. At the same time the elastomer is not bonded to the face of the polyolefin between these selected portions. This makes it ideal for the manufacture of an effectively integral filter plate having a nonmetallic and chemically inert center panel and a synthetic-rubber cover sheet, the former being strong and rigid and the latter highly elastic. The vulcanization is normally carried out by hot-pressing the unvulcanized EPDM on the preheated polyolefin panel so that the form of the elastic sheet formed by the EPDM when it is vulcanized is bound to stay perfect since this sheet is, during its manufacture, bonded to a rigid panel that will prevent it from deforming unintentionally.

According to this invention during the preheating step the selected surface portions are heated to a temperature near but not substantially above the melting point of the polyolefin and for a time long enough to at least soften these selected portions only. When the polymer is an ethylene-propylene-diene elastomer the vulcanization is carried out in between 5 min and 20 min, preferably about 10 min. In addition the vulcanization temperature for the polyolefin generally corresponds to the melting point for the polyolefin. This makes it possible to just barely liquefy or soften the selected portions without melting the entire panel surface and getting an overall bond.

In accordance with this invention the thermoplastic substrate is polypropylene and the selected surface portions are preheated to 164° C. to 167° C., or polyethylene is used and the selected surface portions are preheated to 132° C. to 135° C.

DESCRIPTION OF THE DRAWING

The above and other features and advantages will become more readily apparent from the following, reference being made to the accompanying drawing in which.

SPECIFIC DESCRIPTION

Figure 1:
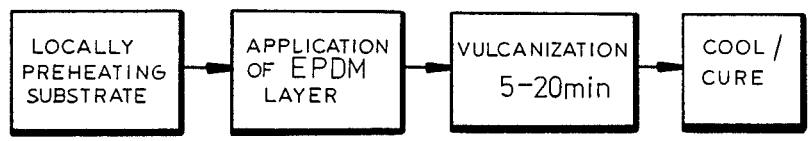
FIG. 1 is a diagrammatic representation of the method of this invention.

As seen in FIG. 1 a thermoplastic polyethylene or polypropylene substrate is joined to a vulcanizable ethylene-propylene-diene elastomer after selecting the materials of the substrate and elastomer such that the vulcanization temperature of the elastomer corresponds generally to the melting point of the substrate by first locally preheating only selected portions of the surface of the thermoplastic substrate while maintaining the rest of the surface and of the substrate at a substantially lower temperature. This can be done by applying a heated and appropriately shaped iron to the face of the substrate or by selectively irradiating these selected portions with infrared heat.

Subsequently an unvulcanized layer of the ethylene-propylene elastomer is applied to substantially the entire surface of the substrate. Typically the EPDM elastomer is poured or applied as a viscous mass to the faces of the polyolefin substrate panel which is arranged horizontally.

In the third step the elastomer layer and thermoplastic substrate are simultaneously compressed and heated to the vulcanization temperature of the elastomer for 5 min to 20 min to vulcanize the elastomer and to unitarily bond the layer and substrate together on the surface at the selected portions thereof but not on the surface between the selected portions. This is best done in a hot press whose platen is configured to impart the desired shape to the outer face of the elastomer sheet thus formed. When polyethylene is used as the substrate the vulcanization is done at 132° C. to 135° C. and when polypropylene is used the temperature is 164° C. to 167° C., but in both cases a treatment time of about 10 min is normally adequate.

Figure 2:
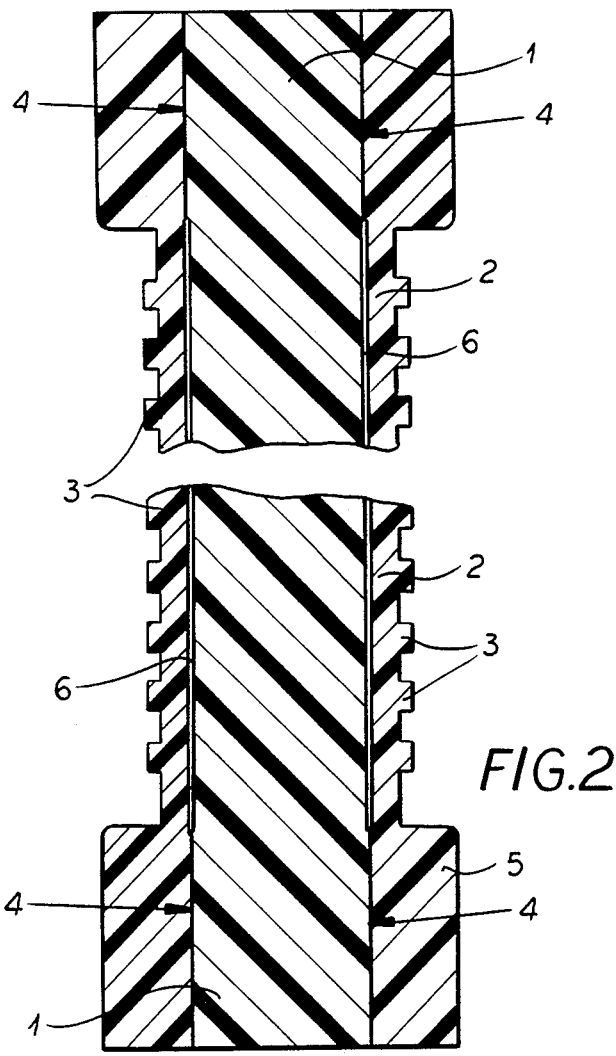
FIG. 2 is a large-scale cross section through a filter plate according to the present invention.

Then the elastomer layer and thermoplastic substrate are cooled to cure them into the filter plate shown in FIG. 2. This plate has a central rigid panel 1 with two opposite and planar faces 4. Overlying each face 4 is an elastic sheet 2 formed with a thick annular rim 5 bounding a ribbed central region 3. The elastic sheets 2 are joined at the rims 5 to the respective faces 4 of the central panel 1, but behind the central ribbed region 3 the sheets 2 are not joined to the surface 6 of the panel 1.

I claim:

1. A method of joining an ethylene-propylene polymer to a surface of a thermoplastic polyolefin substrate, the method comprising the steps of sequentially:
   (a) locally preheating only selected portions of the surface of the thermoplastic substrate while maintaining the rest of the surface and of the substrate at a substantially lower temperature;
   (b) applying to substantially the entire surface of the substrate an unvulcanized layer of the ethylene-propylene polymer;
   (c) heating the polymer layer and thermoplastic substrate to the vulcanization temperature of the polymer to vulcanize same and to unitarily bond the layer and substrate together on the surface at the selected portions thereof but not on the surface between the selected portions; and
   (d) cooling the polymer layer and thermoplastic substrate to cure same.

2. The method defined in claim 1 wherein the vulcanization temperature for the polymer generally corresponds to the melting point for the polyolefin.

3. The method defined in claim 1 wherein during the preheating step the selected surface portions are heated to a temperature near but not substantially above the melting point of the polyolefin and for a time long enough to at least soften these selected portions only.

4. The method defined in claim 1 wherein the polymer is an ethylene-propylene-diene elastomer and the thermoplastic substrate is polypropylene or polyethylene.

5. The method defined in claim 1 wherein step (c) is carried out in between 5 min and 20 min.

6. The method defined in claim 1 wherein step (c) is carried out in about 10 min.

7. The method defined in claim 1 wherein the thermoplastic substrate is polypropylene and the selected surface portions are preheated in step (a) to 164° C. to 167° C.

8. The method defined in claim 1 wherein the thermoplastic substrate is polyethylene and the selected surface portions are preheated in step (a) to 132° C. to 135° C.

9. A method of joining a thermoplastic polyethylene or polypropylene substrate to a vulcanizable ethylene-propylene-diene elastomer, the method comprising the steps of sequentially:
   (a) selecting the materials of the substrate and elastomer such that the vulcanization temperature of the elastomer corresponds generally to the melting point of the substrate;
   (b) locally preheating only selected portions of the surface of the thermoplastic substrate while maintaining the rest of the surface and of the substrate at a substantially lower temperature;
   (c) applying to substantially the entire surface of the substrate an unvulcanized layer of the ethylene-propylene elastomer;
   (d) heating the elastomer layer and thermoplastic substrate to the vulcanization temperature of the elastomer for 5 min to 20 min while compressing the layer and substrate together to vulcanize the elastomer and to unitarily bond the layer and substrate together on the surface at the selected portions thereof but not on the surface between the selected portions; and
   (e) cooling the elastomer layer and thermoplastic substrate to cure same.

10. A filter plate made of a thermoplastic polyethylene or polypropylene substrate and a vulcanizable ethylene-propylene-diene elastomer by sequentially:
    (a) selecting the materials of the substrate and elastomer such that the vulcanization temperature of the elastomer corresponds generally to the melting point of the substrate;
    (b) locally preheating only selected portions of the surface of the thermoplastic substrate while maintaining the rest of the surface and of the substrate at a substantially lower temperature;
    (c) applying to substantially the entire surface of the substrate an unvulcanized layer of the ethylene-propylene elastomer;
    (d) heating the elastomer layer and thermoplastic substrate to the vulcanization temperature of the elastomer for 5 min to 20 min while compressing the layer and substrate together to vulcanize the elastomer and to unitarily bond the layer and substrate together on the surface at the selected portions thereof but not on the surface between the selected portions; and
    (e) cooling the elastomer layer and thermoplastic substrate to cure same.

* * * * *